(12) United States Patent
Bjoernsen et al.

(10) Patent No.: US 7,360,164 B2
(45) Date of Patent: Apr. 15, 2008

(54) COLLABORATION LAUNCHPAD

(75) Inventors: Christian Bjoernsen, San Carlos, CA (US); Stefan Mueller, Sinsheim (DE)

(73) Assignee: SAP AG, Walldorf (DE)

( * ) Notice: Subject to any disclaimer, the term of this patent is extended or adjusted under 35 U.S.C. 154(b) by 656 days.

(21) Appl. No.: 10/378,273

(22) Filed: Mar. 3, 2003

(65) Prior Publication Data

US 2004/0174392 A1 Sep. 9, 2004

(51) Int. Cl.
G06F 17/00 (2006.01)

(52) U.S. Cl. .................. 715/751; 715/752; 715/753; 715/758; 715/759; 709/203; 709/204; 709/205; 709/206

(58) Field of Classification Search ........ 715/748–759; 709/217, 219, 203–206
See application file for complete search history.

(56) References Cited

U.S. PATENT DOCUMENTS

| | | | | |
|---|---|---|---|---|
| 5,323,314 A * | 6/1994 | Baber et al. ................ 705/8 |
| 5,793,365 A * | 8/1998 | Tang et al. ................ 715/758 |
| 5,900,870 A | 5/1999 | Malone et al. |
| 5,960,404 A | 9/1999 | Chaar et al. |
| 5,978,835 A | 11/1999 | Ludwig et al. |
| 6,047,288 A | 4/2000 | Kurosawa et al. |
| 6,138,139 A * | 10/2000 | Beck et al. ................ 709/202 |
| 6,205,478 B1 * | 3/2001 | Sugano et al. ............. 709/223 |
| 6,230,185 B1 | 5/2001 | Salas et al. |
| 6,233,600 B1 | 5/2001 | Salas et al. |
| 6,237,025 B1 * | 5/2001 | Ludwig et al. ............. 709/204 |
| 6,295,536 B1 | 9/2001 | Sanne |
| 6,304,886 B1 | 10/2001 | Bernardo et al. |
| 6,310,941 B1 | 10/2001 | Crutcher et al. |
| 6,363,352 B1 | 3/2002 | Dailey et al. |
| 6,418,214 B1 | 7/2002 | Smythe et al. |
| 6,446,113 B1 | 9/2002 | Ozzie et al. |
| 6,471,521 B1 | 10/2002 | Dornbush et al. |
| 6,557,027 B1 * | 4/2003 | Cragun .................. 709/204 |
| 6,591,300 B1 * | 7/2003 | Yurkovic ................ 709/226 |
| 6,691,162 B1 * | 2/2004 | Wick .................... 709/224 |
| 6,938,069 B1 * | 8/2005 | Narayanaswamy ......... 709/204 |
| 6,993,723 B1 * | 1/2006 | Danielsen et al. .......... 715/751 |
| 7,107,312 B2 * | 9/2006 | Hackbarth et al. ......... 709/204 |
| 7,130,883 B2 * | 10/2006 | Zhu et al. ................ 709/204 |

(Continued)

OTHER PUBLICATIONS

Munir Mandviwalla and Shariq Khan, Studing the Integration of Technology with Collaborative Object Workspaces (COWS), pp. 181-186, ACM 1997.*

(Continued)

Primary Examiner—Tadesse Hailu
(74) Attorney, Agent, or Firm—Mintz, Levin, Cohn, Ferris, Glovsky & Popeo, P.C.

(57) ABSTRACT

Integrating collaboration products or processes includes displaying a plurality of contacts in a collaboration display area, receiving a selection of one or more contacts from the plurality of contacts, displaying a plurality of collaboration service selections from a plurality of collaboration service providers in the collaboration display area, receiving a first collaboration request relating to one of the collaboration service selections provided by a first collaboration service provider, displaying a first collaboration session from the first collaboration service provider, and associating the the one or more selected contacts with the first collaboration session. A selection of business objects may also be received, and may be made available from the collaboration session.

13 Claims, 15 Drawing Sheets

U.S. PATENT DOCUMENTS

| | | |
|---|---|---|
| 7,249,157 B2 * | 7/2007 | Stewart et al. .............. 709/204 |
| 7,257,541 B1 * | 8/2007 | Notani .......................... 705/1 |
| 2002/0143876 A1 | 10/2002 | Boyer et al. |
| 2002/0143877 A1 * | 10/2002 | Hackbarth et al. .......... 709/205 |
| 2003/0085923 A1 * | 5/2003 | Chen et al. ................. 345/751 |
| 2003/0163547 A1 * | 8/2003 | Beisty et al. ............... 709/217 |
| 2003/0167302 A1 * | 9/2003 | Zhu et al. ................... 709/204 |
| 2004/0085355 A1 * | 5/2004 | Harmes et al. ............. 345/751 |
| 2004/0107249 A1 * | 6/2004 | Moser et al. ............... 709/204 |
| 2004/0107256 A1 * | 6/2004 | Odenwald et al. .......... 709/205 |
| 2005/0132000 A1 * | 6/2005 | Richardson et al. ........ 709/204 |

OTHER PUBLICATIONS

Banavar, et al., Rapidly Building Synchronous Collaborative Applications By Direct Manipulation, pp. 139-148, ACM 1998.*

* cited by examiner

COLLABORATION LAUNCHPAD

BACKGROUND

The following description relates to integration of multiple on-line collaboration tools and services.

Many collaboration tools exist today to help computer users communicate with other users in different locations in an efficient manner. For example, network meeting applications provide a virtual space in which to hold real-time, synchronous meetings. Such applications can offer live presentations or other objects for meeting participants to review and edit, instant messaging (IM), chat services for communications among the participants, and whiteboards on which participants can provide input. Network meeting applications can also provide, or be integrated with, teleconferencing or video teleconferencing services. These applications include WebEx Lotus Sametime Centra CentraOne, and Placeware Conference Center. Other collaboration applications may provide asynchronous interaction. For example, group members may interact using e-mail or other messaging options, and a collaboration area may be provided where members can review, annotate, comment on, and edit documents.

In general, different collaboration applications can provide users with different benefits. In some situations, one application is appropriate, while in others, a different application may be. It is unlikely, however, that any single company will provide the best-of-breed application in all of the areas that will interest a typical user. As a result, users may be required to establish a number of accounts, learn a number of interfaces for establishing collaboration sessions, and separately schedule and track various sessions.

SUMMARY

This document discloses a method and system that assists in integrating the services provided by various collaboration tools or applications. In one aspect, a computer-implemented method of providing collaboration services is provided. The method comprises displaying a plurality of contacts in a collaboration display area, receiving a selection of one or more contacts from the plurality of contacts, displaying in the collaboration display area a plurality of collaboration service options associated with a plurality of collaboration service providers, receiving a collaboration request relating a displayed collaboration service option, initiating a collaboration session with the collaboration service provider, and associating the one or more selected contacts with the initiated collaboration session A plurality of business objects may also be displayed in the collaboration display area, and a selection of one or more business objects may be received so that one or more business objects are made accessible from the collaboration session. The selection of the business objects may be received after the collaboration session is initiated, and the objects may be displayed as a hierarchy of folders and objects associated with the folders.

In some embodiments, a plurality of available collaboration rooms may be displayed in the collaboration display area. Also, the status of each of the plurality of contacts may be displayed, and the contacts may comprise a list of contacts, including frequently used contacts. Information about the collaboration session may also be provided to a data repository. In addition, a drop zone may be displayed in the collaboration display area, information relating to an item dropped in the drop zone may be received, and a selection corresponding to the item may be displayed in the collaboration display area. The item may comprise contact identification entity having information for establishing communication with a computer user. The item may also comprise an object identification entity having information for establishing a connection to a document in a collaboration session.

In another embodiment, a second collaboration request relating to one of the collaboration service options provided by a second collaboration service provider may be received, and a second collaboration session from the second collaboration service provider may be initiated. The first and second collaboration sessions may be displayed concurrently, and a session end request may be received so that display of the first and second collaboration sessions is ceased.

A computer-implemented method for launching collaboration services is also described, comprising receiving a selected contact representing a user to be connected to a collaboration session, receiving a selected object to be accessed in the collaboration session, receiving a selected collaboration service for providing the collaboration session, and launching a collaboration session with the selected contact and the selected object corresponding to the selected collaboration service. A selection of a plurality of contacts may also be received, where a collaboration session is launched with the selected contacts.

The selected contact, selected object, and selected collaboration service may be received from a computer application as a result of an automated selection process. Also a contact list containing the selected contact, an object list containing the selected object, and a collaboration service list containing the selected collaboration service, may be displayed in a collaboration display area before launching the collaboration service. The selected contact, selected object, and selected collaboration service may also be received from a computer application in response to selections from a user of the computer application. Also, a contact may be received in a drop zone and be displayed in the contact list.

In one embodiment, a collaboration launch pad comprises a collaboration service display area presenting a plurality of available collaboration services operable to permit the initiation of a collaboration session, a contact display area presenting a plurality of contacts operable to permit the selection of one or more contacts for the collaboration session, and an object display area presenting one or more objects operable to permit the selection of an object to be accessed from the collaboration session. The launch pad may also comprise a collaboration room display area presenting one or more available collaboration rooms operable to permit access to the one or more collaboration rooms. In addition, an object drop zone may be provided by which objects may be added to the launch pad. The object drop zone may be operable to receive a contact and add information relating to the contact to the contact display area. In addition, a status indicator associated with each contact for indicating the current status of the contact may be provided, and a data repository may store information relating to the collaboration session.

Advantageously, the method and system may provide effective integration for a user across a heterogeneous mix of collaboration service providers. In addition, a user may be provided with the ability to schedule and manage various collaboration sessions from a single calendar or scheduling application.

Details of one or more implementations are set forth in the accompanying drawings and the description below. Other features and advantages may be apparent from the description and drawings, and from the claims.

DRAWING DESCRIPTIONS

These and other aspects will now be described in detail with reference to the following drawings.

Like reference symbols in the various drawings indicate like elements.

DETAILED DESCRIPTION

The systems and techniques described here relate to enabling a computer user or users to establish a collaboration session through a number of different collaboration services.

Figure 1:
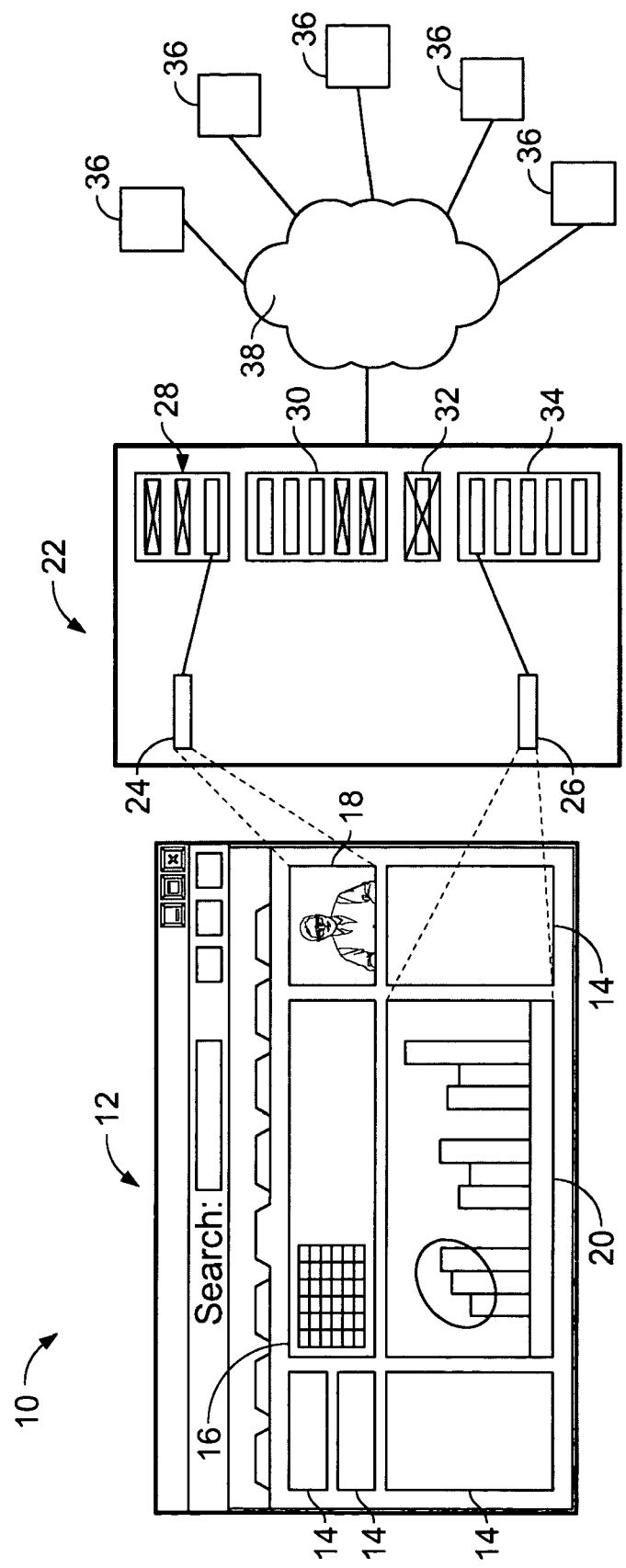
FIG. 1 is a block diagram of a system for managing communications between a computer user and a variety of collaboration services.

FIG. 1 is a block diagram of a system 10 for managing communications between a computer user and a variety of collaboration services. In the pictured example, the computer user interacts with system 10 through a portal 12. Portal 12 is a central interface that provides the user with access to various resources and information, including information that is stored in different formats on different computer systems. In addition, the portal 12 may provide updated information in real-time or near real-time, so that as the underlying data changes, the information displayed in portal 12 also changes. Portal 12 provides this information through various integrated views (also known as "iViews") 14-26. These views can display information from enterprise resource planning (ERP) applications, customer resource management (CRM) applications, supplier resource management (SRM) applications, corporate Intranets, corporate workflow applications, business-to-business (B2B) commerce applications, the Internet, or Groupware applications (such as Microsoft Outlook or Lotus Domino), among other applications.

Portal 12 can be configured to show a variety of views. For example, general views 14 can show updated information regarding industry-specific news headlines, e-mail messages, stock prices, or current sales volume in a business, among other things. In addition, some views can be used to show information relating to a collaboration session, such as an e-meeting. For example, calendar view 16 shows a calendar along with information relating to the user's schedule. Using the calendar view 16, the user may select a date and time to set up a proposed collaboration session with one or more other users. Calendar view 16 may directly access schedule information stored by a standard calendar tool employed by the user, such as Microsoft Exchange or Lotus Domino. Alternatively, view 16 may provide an area to present a calendar generated by the user's calendar tool. As such, calendar view 16 can serve as a central scheduling tool for the user, or can also serve as an alternative scheduling tool that allows the user to keep a single, common schedule. The manner in which a user may schedule a collaboration session is described in more detail below.

Other views may be used to present one or more collaboration sessions, or sessions in which participants can interact with each other synchronously. For example, teleconference view 18 shows video of another user, and portal 12 may also provide corresponding audio. Likewise, presentation view 20 shows a presentation or document that may reside on the user's system or elsewhere, and that may be viewed and annotated by other users in a collaboration session. Teleconference view 18 and presentation view 20 may provide any of a number of features commonly used with electronic meeting and teleconferencing applications. Other collaboration sessions may involve instant messaging, chat, desktop sharing, document sharing, and application sharing, among others.

The collaboration sessions, as represented by teleconference view 18 and presentation view 20, may be established with the assistance of integration system 22. Integration system 22 may serve as an intermediary that aids the communication between a user and a variety of collaboration providers 36. Advantageously, integration system 22 may relieve the user of the chore of locating an appropriate or best collaboration provider for a particular situation. In addition, integration system 22 may control access for the user to particular collaboration providers 36. For example, a corporation or other enterprise may have established relationships with particular collaboration providers 36, and integration system 22 may be configured so that employees of the corporation may only use those collaboration providers 36.

Certain users may be given access to particular providers while other users are given access to different or additional providers. Such discrimination and control may be beneficial, for example, where a company wants to provide certain employees with limited chat capabilities, but wants to provide other users, such as engineers working on a high-priority project, with greater capabilities, such as full real-time document sharing capabilities and access to electronic collaboration rooms. Moreover, where a first company has entered into a joint development project with another company that uses collaboration services that are not normally used by the first company, integration system 22 may be used to give such special access to these other applications to all members of the joint development team, including those affiliated with the first company.

In addition, integration system 22 may track information regarding collaboration sessions, such as the collaboration provider and the beginning and ending time of the session, so that the cost of the session may be assigned to a particular user (whether internal to one company or across several companies). Furthermore, integration system 22 may provide a user with a single access point for scheduling and managing various collaboration sessions, regardless of the identity and particular requirements of the provider. Additionally, one of the service providers may be a service provider operated by the user's own organization, so that collaboration sessions that are entirely internal to the organization can be operated internally, while sessions that involve people outside the organization could use third-party service providers. Other advantages will become apparent upon reading the following description.

As pictured, integration system 22 may provide a variety of connector groups 28-34 configured for communicating with collaboration providers 36. Each connector group may include a number of connectors for providing a certain type of collaboration service, such as video teleconferencing. The connectors in each group may be software modules that are written to interface the operation of a certain provider to integration system 22. For example, a standard API may be circulated for integration system 22, and a service provider wishing to offers its services to users of integration engine 22 may author a connector to meet the requirements of the API. The connectors translate commands from integration system 22 into whatever format is expected by the particular service provider.

For example, connector group 28 may contain connectors for communicating with collaboration providers that offer teleconferencing services. Likewise, connector group 34 may contain connectors for communicating with collaboration providers that offer presentation sharing services. Although the connector groups are shown as distinct groups for illustrative purposes, integration system 22 may represent the applications available from various providers in any of a number of ways. For example, a particular service provider could author a single connector that would operate with more than one collaboration service offered by the provider.

Integration system 22 also receives collaboration scheduling requests and other information from portal 12, and may provide portal 12 with information about the status of a session or sessions. In this manner, portal 12 serves as a client application for integration system 22. For example, a user may employ portal 12 to make a meeting request, such as by using calendar view 16. Portal 12 may cause information regarding the meeting request to be transmitted to integration system 22. This information may include, for example, the beginning and ending times of the meeting or session, the expected participants, and the types of services or applications to be made available during the session. Using this information, integration system may generate a session record 24, 26 that is then associated with portal 12 and one of more collaboration providers 36 and related collaboration provider connectors.

As an example, a user may seek to establish a video teleconference session and document sharing meeting with one or more other users, and integration system 22 may establish session record 24 to record information about the teleconference. The user may use the portal to access the data in his or her standard scheduling application, and may select to schedule a collaboration session. Integration engine 22 may save the information in session record 24, and may transmit a message to the user's application so that that a link to the integration system 22 is formed in the session schedule. The user may then select the link when it is time for the session, so as to send a signal to integration system 22 that causes a message to be sent to the service provider or providers to start the session.

The selection of particular connectors may be controlled by pre-established rules. Thus, as shown in FIG. 1, the user may be blocked from obtaining teleconferencing services from two providers (as shown by "X's" through their connector boxes) that would otherwise be available through integration system 22. The user may also be allowed to use any of the available providers in a group, as shown by connector group 34, which represents connectors to providers of chat applications. In such a situation, a priority rule may be used to provide the user with a default provider, and the user may then be given the opportunity to override the default and select a different provider. Also, as shown by connector group 32, an entire group or class of applications may be blocked from a user. For example, a low-level employee may be denied access to an expensive teleconferencing service. Finally, some providers may be blocked while more than one are still allowed, as shown by connector group 30. In such a situation, one of the available providers may be assigned by default, and the user may be given the opportunity to override the default.

The providers to which a user will be given access—the providers available to the user—may be determined in a variety of ways. For example, as noted above, the providers may be only those providers with which the user or the user's employer has contracted. They could also be a subset of the providers with which the employer has contracted, as limited by the particular role played by the user. In addition, the available providers may also be determined as the common set of providers that are available to all the participants that have been selected for a particular meeting or session.

Integration system 22 can also provide authentication information regarding a user to a service provider. For example, some service providers may require user account information and passwords before a user can access the providers' applications. Integration system 22 may access such information that is stored for the user (such as in a corporate information system) and pass the information to the service provider for the user.

The configuration of integration system 22 may take a variety of forms. For example, although session records 24, 26 are shown separately for illustrative purposes, a single record could be used to schedule multiple different services from multiple different providers. Moreover, although the connection between portal 12 and a client is shown as a direct connection, and the connection with service providers 36 is shown as a connection through the Internet 38, the communications could flow via any number of paths. For instance, all of the messages could flow over the Internet or another public or private network, with some directed between integration system 22 and the user using portal 12, some between integration system 22 and service providers 36, and some directly between the user using portal 12 and one or more of service providers 36.

Figure 2:
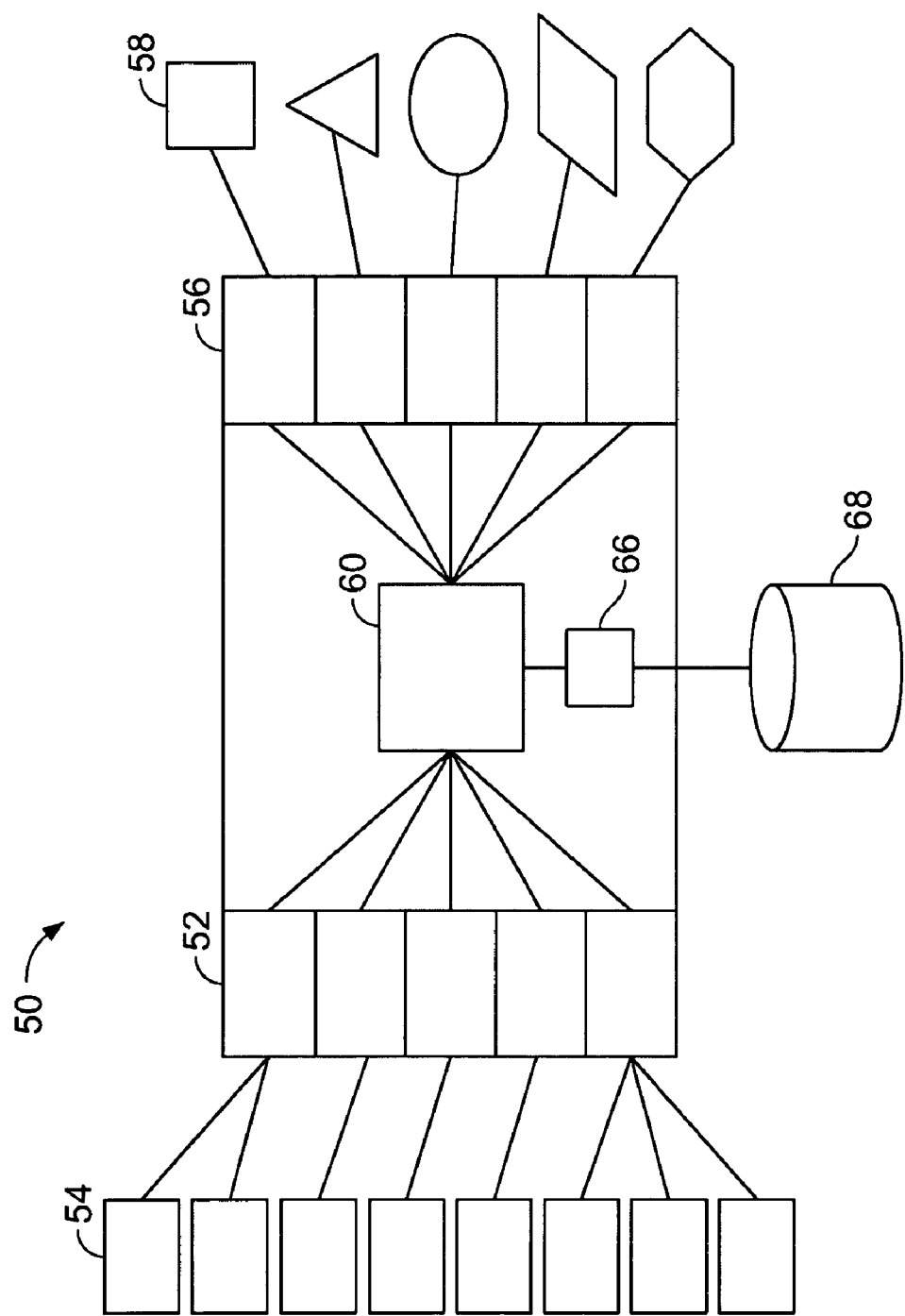
FIG. 2 is a block diagram of an integration system.

FIG. 2 shows a block diagram of an integration system 50, which communicates with other applications through client connectors 52 and service provider connectors 56. Clients 54 may be any of a number of different users of collaboration services, such as individuals or employees in a company or other enterprise. Clients 54 may also come from various organizations and access one or more integration systems 50. Service providers 58 can be any of a number of sources of collaboration products or services.

Integration system 50 is managed by a session controller 60, which sends information to, and receives information from, client connectors 52 and provider connectors 56. For example, session controller 60 may receive a meeting request from a user through a client connector and may then interact with the user to allow the user to select available applications (such as videoconferencing and chat) for the session, and service providers for the applications.

Using the client connector, session controller 60 may translate the information received from the user into a format that can be recognized by a particular service provider 58 so as to notify the service provider that a meeting has been requested. Session controller 60 may also interface with other participants in the meeting and may update the appropriate service provider 58 and the remaining participants about the status of each other participant. Alternatively, such updates may take place directly between service provider 58 and the various participants, and session controller 60 may then be updated with appropriate information regarding the meeting or session.

Session controller 60 can save information about various sessions in repository 68 using repository interface 66. For example, session controller 60 can save information about expected meetings so that users can access the information and review it or make changes to it. Also, once a meeting has started or after it has ended, session controller 60 can save various history information regarding the meeting for later use.

As one example, session controller 60 can save information regarding the start and end times of a meeting, along with the meeting host and participants, to a structured data storage location, such as a business warehouse. That information may then be used and accessed by other applications, such as a use allocation application that invoices the user or the user's group for the use of a particular collaboration service. For example, a large corporation may have a fixed-rate agreement with various service providers, and the stored information may be used to allow the corporation to allocate the cost of its collaboration services across its various divisions or departments. Other examples of information that may be saved include: session start and end dates and times, session subject, session invitation text, session host and participants, the session service provider, and resources (such as documents, presentations, chat transcripts, or web sites visited) used or created during the session.

Other, less structured data about a session may also be stored. For example, chat logs, video or audio records, or various document or presentation edits may be saved during or at the close of a session. For example, the transcript of a design meeting (whether from a chat application or a voice recognition-transformed recording of the session) could be stored in a knowledge management system so that members of the design group may later access the information, such as through a search engine. Workflow rules could also be applied to saved information. As an example, a document that is edited during a session may be routed for final approval to the various participants of the meeting, and may also be routed for approval to those who were invited to the meeting but did not attend, or to others who were not even invited (such as supervisors).

Session controller 60 may be configured so as to permit each client 54 to schedule and manage collaboration sessions using a single application. For example, a user of client 54 may use a standard calendar application, or a portal that displays a calendar application, to schedule collaboration sessions. The portal or calendar application may transmit a message or messages to session controller 60 containing information regarding the expected start and end times of the session, along with the expected participants. Session controller 60 may then return a message that causes the calendar application or portal to attach a session identifier, such as a hypertext link directed toward session controller 60, to the calendar for the client.

When the time for the session arrives, the portal or calendar application may send a message to session controller 60 to cause session controller 60 to start the session. For example, the user may click on a hyperlink to cause an HTTP-formatted message to be sent to session controller 60, which will then access an associated session record in repository 68. Session controller may then use the information in the record to cause a collaboration session to begin between client 54 and one or more service providers 58, such as by redirecting an application at client 54 toward the one or more service providers. Changes to collaboration sessions can be made in a similar manner, so that session controller 60 stays in synchronization with the schedule stored locally at client 54. In this manner, a user can continue to use his or her preferred scheduling application to establish sessions with multiple different collaboration service providers 58. In addition, a user may be able to establish a collaboration session that uses services from multiple service providers 58 using a single calendar entry.

Figure 3:
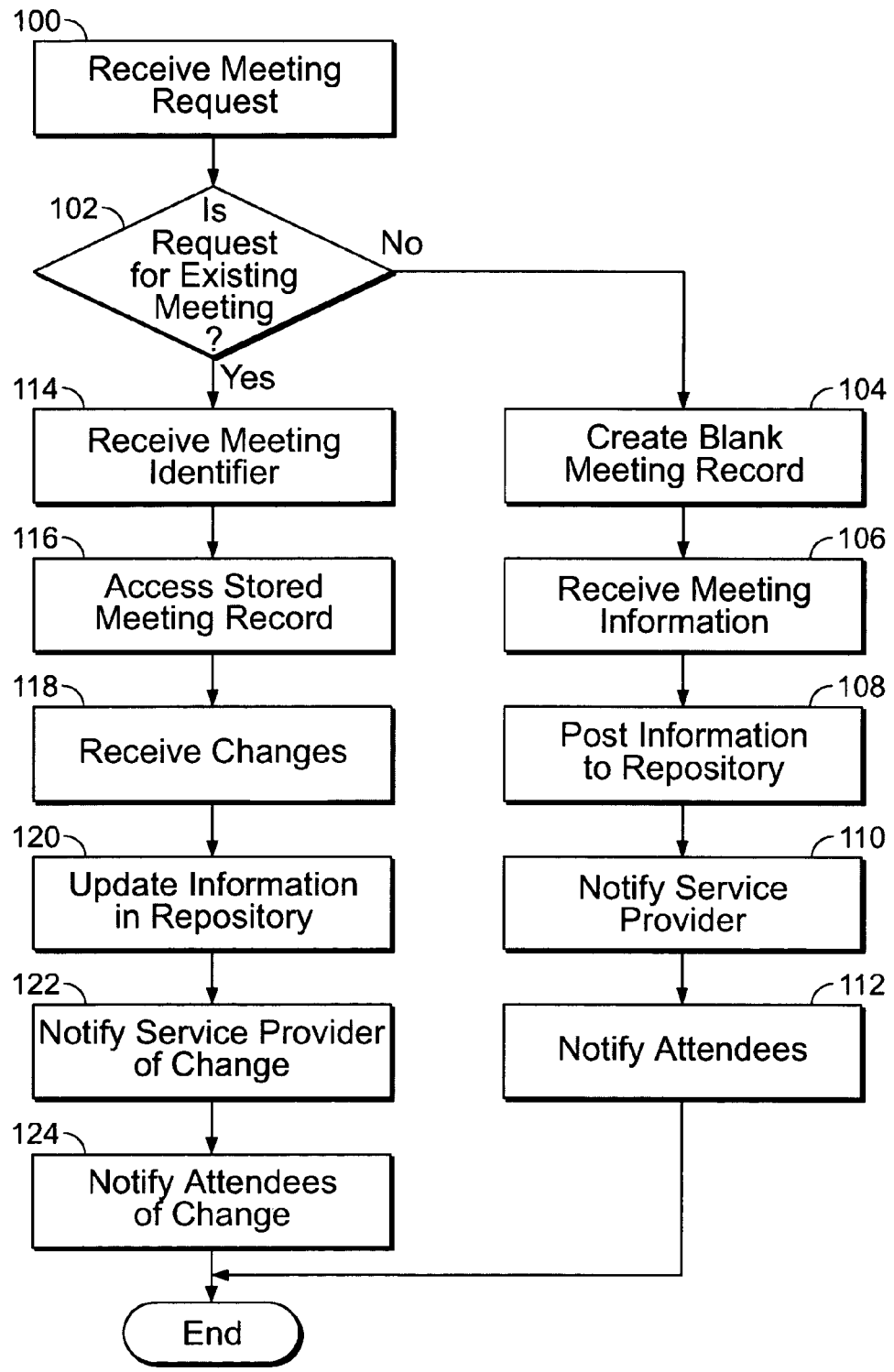
FIG. 3 is a flowchart of a process for establishing a collaboration session.

FIG. 3 is a flowchart of a process for establishing a collaboration session. At block 100, a system receives a request from a user regarding a collaborative session. If the request does not relate to any meeting that has yet been established, as determined at block 102, the system creates a blank session record at block 104. This session record can include fields for various parameters relating to a session, as discussed above. The system may then, at block 106, receive information from the user or elsewhere regarding the session to be established. Once the system has received the appropriate information, which may be indicated by the user clicking on a submission button, and may be provided to the system concurrently with the session request, the information may be posted to the repository as indicated by block 108. In addition, the system may also notify the service provider (block 110) and any selected attendees (block 112) of the session. In addition, such a notice may be provided by the first user or by the service provider.

The system may also access a database of available providers so as to choose a particular provider for the user, provide the user with a list of available providers, or inform the user that a selected provider is not available to the user. The session request may also indicate that an instant session, rather than a scheduled session, is desired, so that the session is begun immediately upon establishing the session.

If a meeting has already been established, the system may seek and receive an identifier, at block 114, regarding the meeting that the user would like to review. This identifier may be provided, for example, by the user directly or by information sent from the user's application, such as by a URL identifier that the user has selected. At block 116, the system accesses the stored meeting record so that the meeting information may be displayed to the user. Upon reviewing the information, the user may make changes, as shown at block 118, such as by rescheduling the session or adding or removing invitees. Once the changes are complete, the information in the repository may be updated (block 120), and the service provider (block 122) and attendees (block 124) may be notified. In addition, the system may send information to the user to update the user's schedule with the new session information.

The system may also notify the user of any changes in provider that are required from the changes the user has made. For example, if the user has added a participant that cannot use a particular provider, the system can change providers for the session or can give the user an option to select a new provider. As one example, if the meeting previously included only participants who worked for a single company, the company's own network may have been assigned to provide the collaboration services, while if a participant from another company is added, a third-party service provider may be needed.

Figure 4:
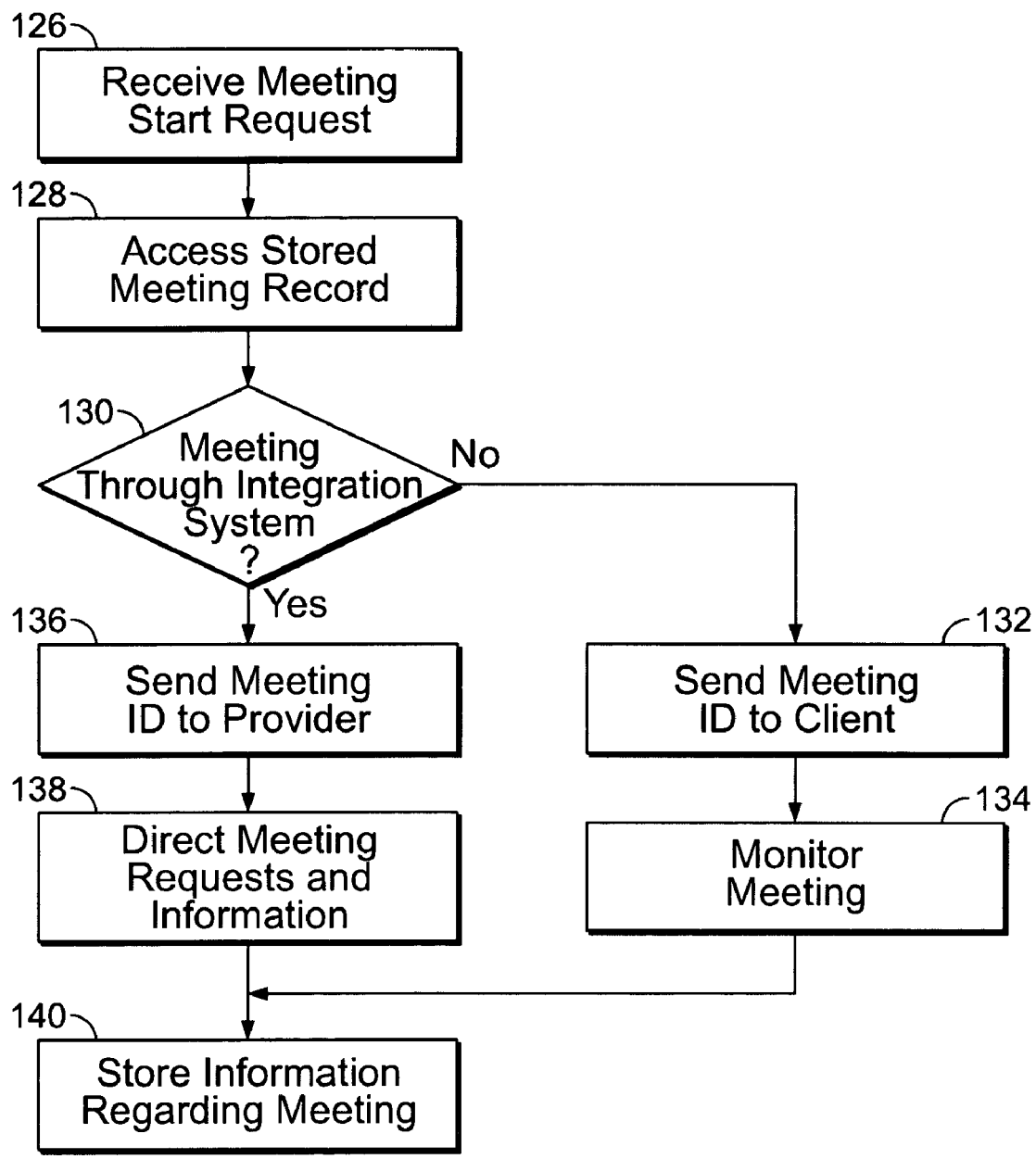
FIG. 4 is a flowchart of a process for starting a collaboration session.

FIG. 4 is a flowchart of a process for starting a collaboration session, such as a session that has previously been scheduled. At block 126, the system first receives a session start request. This request may be generated, for example, in response to a user's clicking on a hyperlink to start a meeting, or automatically at a preset time by the user's system, by a service provider, or by the integration system. Other information about the session may then be accessed from the stored session record (block 128). The session may then be initiated with the service provider, either directly by the integration system or by the user's system (as determined at block 130).

Where the session is initiated through the integration system, the integration system may send a session identifier to the service provider (block 136), and may subsequently receive communications regarding the session and redirect them either to the service provider or to participants in the session (block 138). The integration system may also take a more passive role, and may send identifying information regarding the session to the client system used by the user (block 132), which may in turn forward the information to the service provider. For example, the integration system may send an HTTP-formatted signal or signals to the client to redirect a web browser or other application, such as a view in a portal, to the service provider, and also provide the client with the appropriate identification and authentication information. In such a situation, the communication may occur between the various users and the service provider, as if the integration system were absent.

However, certain information regarding the session may be intercepted by, or directed to, the integration system (block 134). The information may also be sent to the integration system when the session is complete, along with additional information, such as transcripts, audio files, and video files from the sessions. This information may then be stored in the repository (block 140) or another appropriate data store or data stores. For example, the start and end times of the session, along with identifier for each session participant, may be stored. Also, more complex information, such as copies of documents that were shared during the session, may also be stored. In one example, the service provider may send a signal and additional information to the integration system at the close of the collaboration session or at some other point in time.

Figure 5:
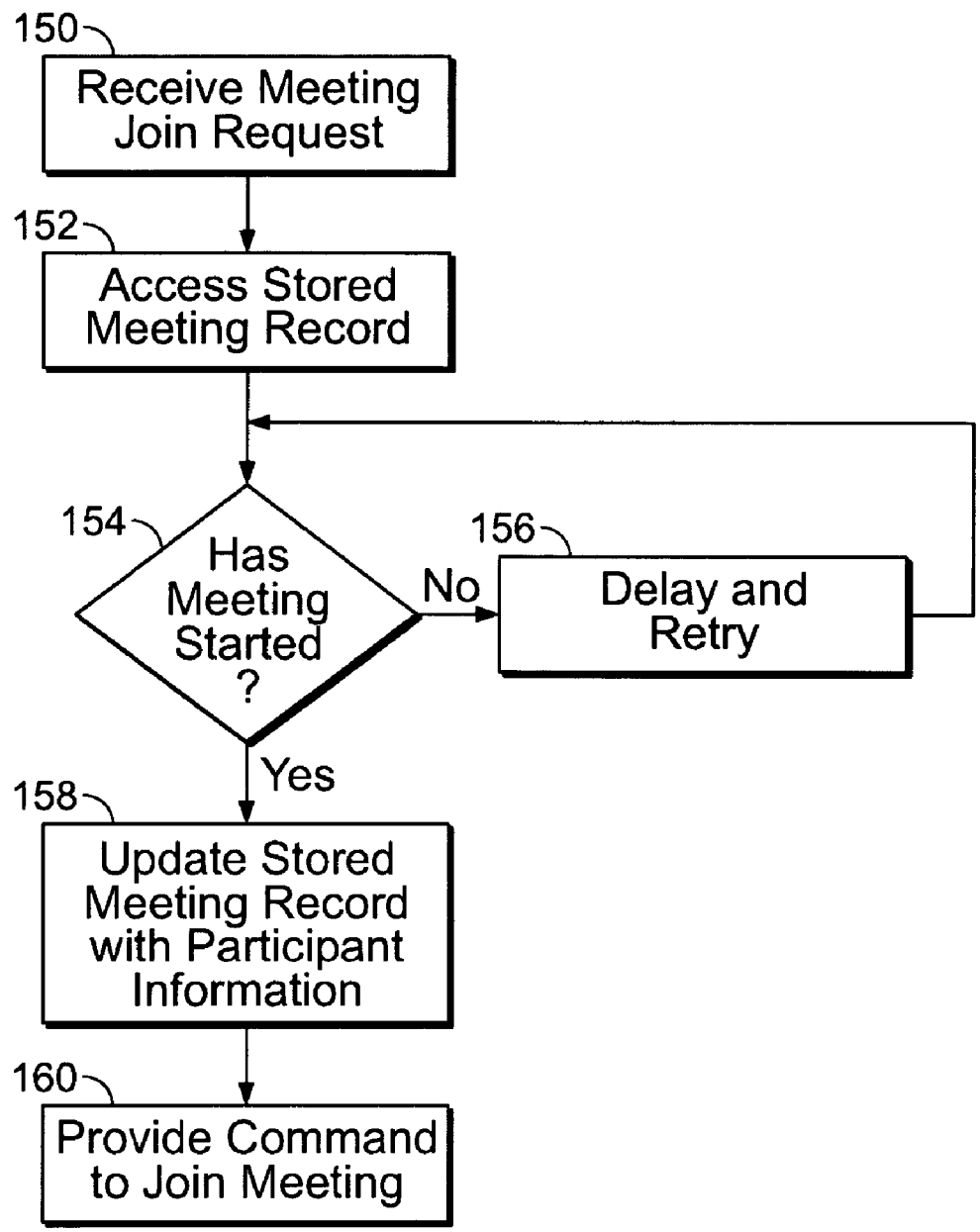
FIG. 5 is a flowchart of a process for joining a collaboration session that has been started.

FIG. 5 is a flowchart of a process for joining a collaboration session that already has been started. This process may apply, for example, to users who have been invited to participate in a session. At block 150, the system receives a request to add a participant to the meeting. The stored session record may be accessed (block 152) to determine the rights of the particular user with respect to the session (e.g., whether the user has been invited). If the session has not yet been initiated (as tested by block 154), the system may delay the user until the meeting has been started (block 156). For example, the system may periodically re-send requests to the service provider regarding the session.

Alternatively, the collaboration application may be configured to transmit an alert signal so as to cause the computer system of the user who is waiting, to generate an alert and to launch the session. This alert signal may be triggered by a signal from the collaboration service provider. As an option, the system may provide the user with a diversion, such as a puzzle, a simple videogame, music, or other audio to keep the user interested and occupied while waiting for the session to begin. Also, the system might connect the user to the collaboration provider (such as by redirecting the user's application to the provider with an appropriate message and authorization/identification information) and allow the provider to hold the user until the session begins.

If the session has started, the system may update the stored record with information regarding the new user (block 158), and the service provider may then be provided with a command to add the user to the session (block 160), either from the integration system or from the user's system, such as by the integration system redirecting the user's application to the service provider, as described above.

Figure 6:
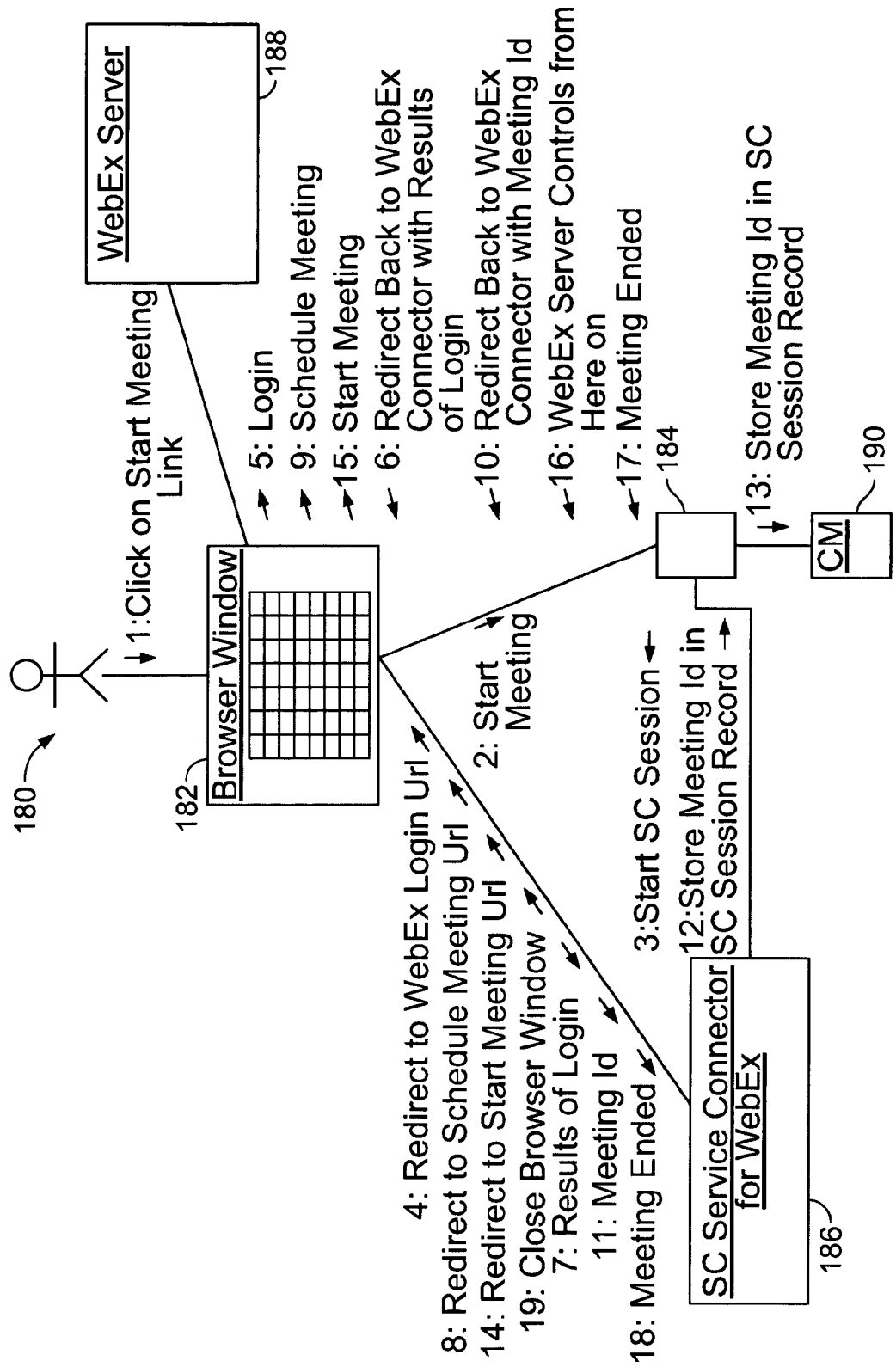
FIG. 6 is an interaction diagram showing steps that may be performed to start a collaboration session.

FIG. 6 is an interaction diagram that shows steps that may be performed to start a collaboration session. The figure shows various parts of a collaboration system with communication links between them, with numbered and described arrows that show, in general, the order in which particular actions may be taken, and the actors connected by the actions. For example, in FIG. 6, user 180 provides his or her user application 182 with a command to start a session, and the user application 182 forwards the request (either as it was sent or after transforming it) to integration system 184. The command may be, for example, a manual clicking on a link in a schedule entry, or it could be generated automatically be the user's scheduling application. The link may be a URL address at integration system 184, that was previously sent from integration system 184 to user application 182 when the session was scheduled.

Alternatively, the schedule may be kept by integration system 184, so that integration system 184 starts the process (such as by sending a signal to user application 182 so that it alerts the user 180 of the impending session and seeks a response from the user 180). In one embodiment, user application 182 may be a browser and may communicate using HTTP messaging. Alternatively, user application 182 may be a portal or an application that interacts with a portal and may treat integration system 184 as a general web service. Other configurations may also be used.

Integration system 184 then causes service connector 186 to send a redirection signal to browser 182, which may in turn cause browser 182 to log into service provider 188, which in this example is a WebEx application. Results of the login may be returned to service connector 186 via user application 182, and meeting scheduling also may occur between service connector 186 and service provider 188, through user application 182 in a similar manner. With the schedule set, a session ID may be issued by service provider 188 and stored in repository 190. Once the session is started, control may be transferred to the service provider 188 until the session ends, at which point additional information may be stored in repository 190 after being received from user application 182 or service provider 188. In addition, service connector 186 may monitor the progress of the session and may capture or produce information about the session that can be accessed later.

Additional collaboration sessions may also be established concurrently with the first collaboration session so that they have partial or complete time-wise overlap. For example, user 180 may schedule multiple services from different vendors for a single session. In addition, user 180 may choose to have multiple sessions operating at the same time, so as to perform multiple jobs at the same time.

Figure 7:
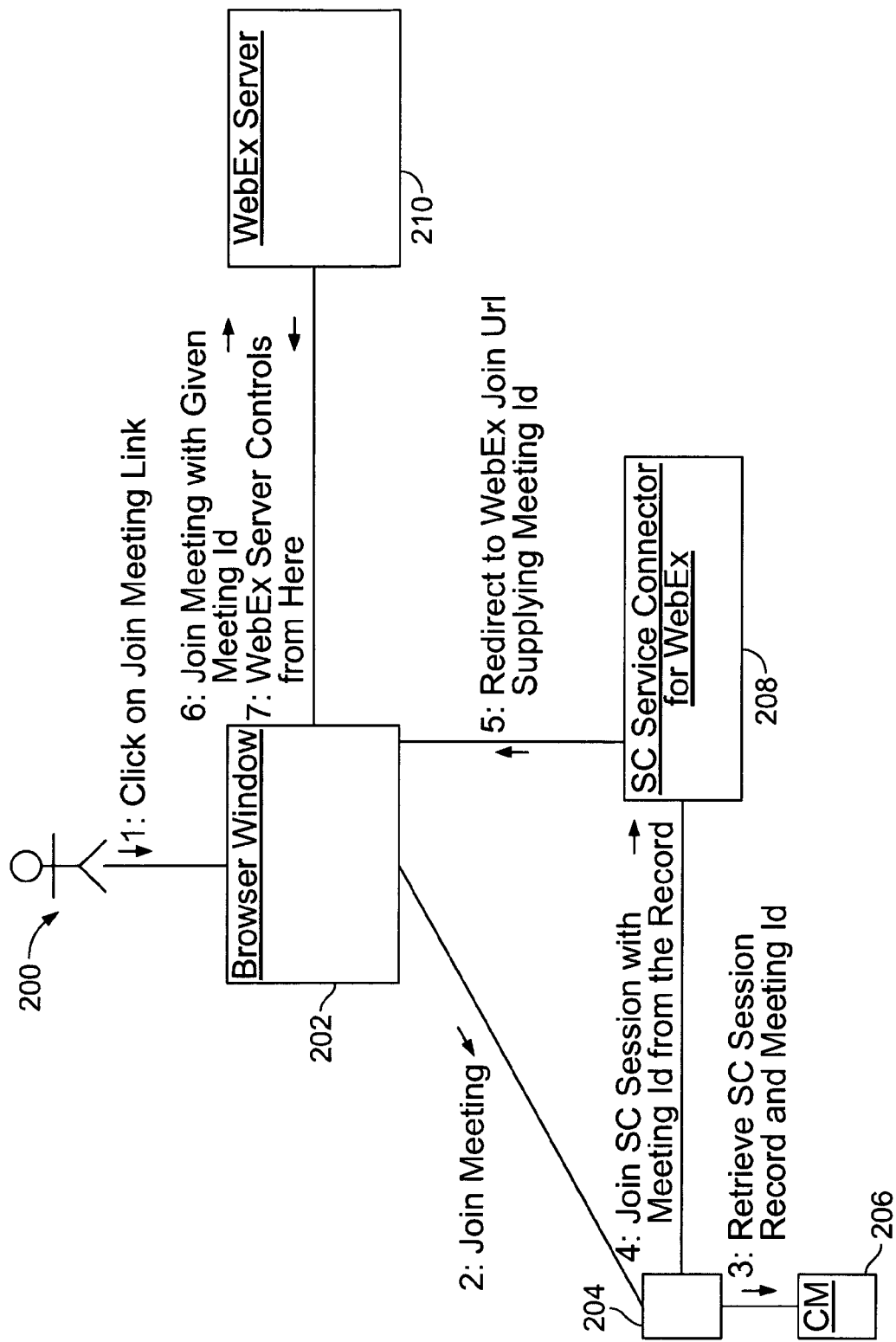
FIG. 7 is an interaction diagram showing steps that may be performed to join a scheduled collaboration session.

FIG. 7 is an interaction diagram that shows steps that may be performed to join a scheduled collaboration session. User 200 may initially click (such as on a URL link) to join a session, and user application 202 may forward the request to integration system 204, which may in turn retrieve information about the session from repository 206. Integration system 204 may then send a signal to service connector 208 so as to redirect user application 202 to the appropriate service provider 210—here again, a WebEx server—that then controls further interaction with the new user. Again, service connector 208 may monitor the session to obtain or create information about it. In addition, service connector 208 and/or integration system may receive information about the session, such as from service provider 210.

Figure 8:
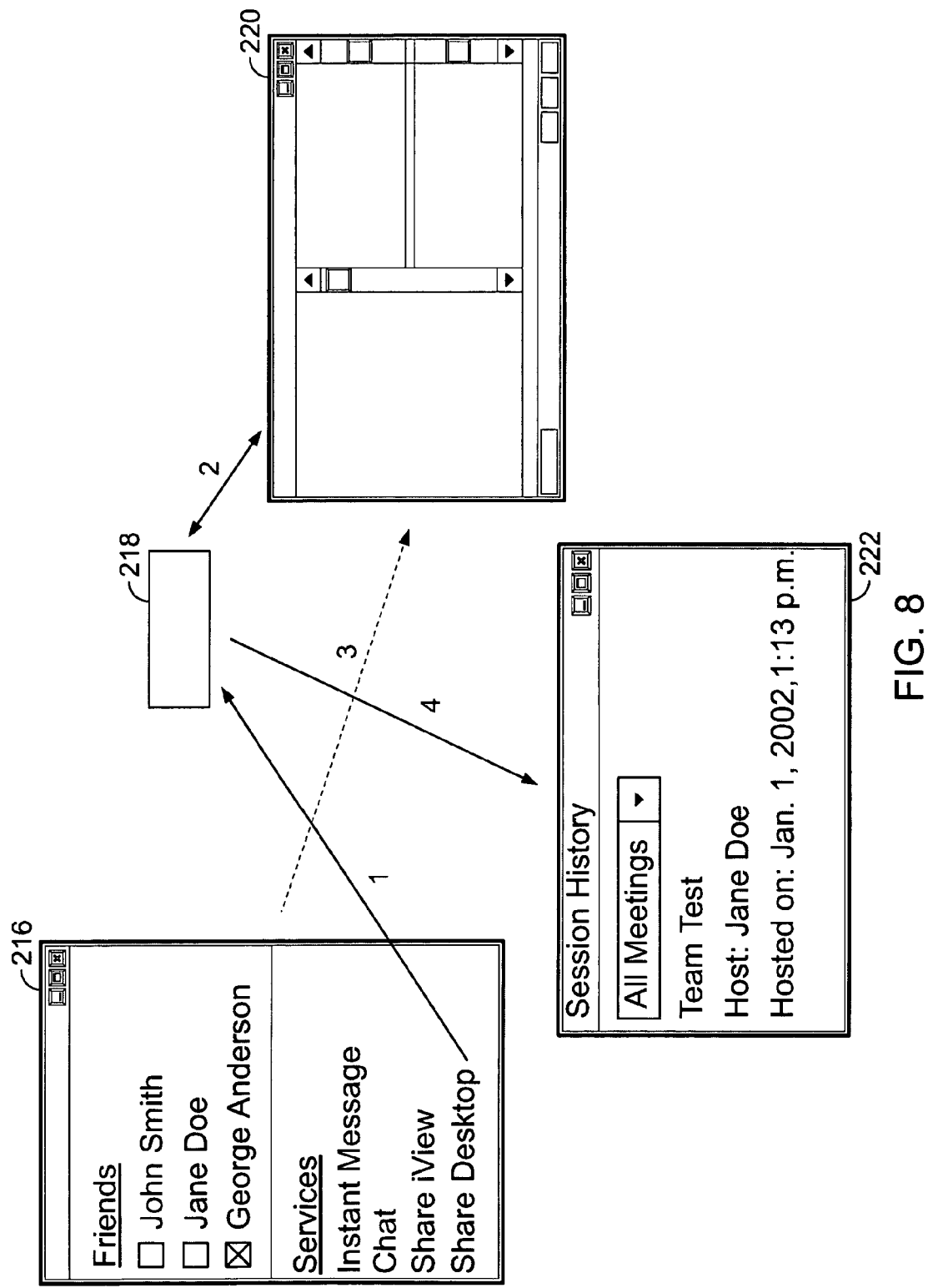
FIG. 8 is an interaction diagram showing steps that may be performed to start an instant collaboration session.

FIG. 8 is an interaction diagram that shows views that a user may be presented with in connection with steps performed to start an instant collaboration session. As shown, a view 216 from a portal may show various potential participants for a collaboration session, and may also provide a number of collaboration services to be used, such that clicking on one of the services will automatically launch the service. The selection of the service in view 216 is communicated to integration system 218, which then informs a service provider (such as by establishing session information and passing the information to the provider by redirecting the user's application), and hands over control of the session to the service provider, as shown by view 220. At an appropriate point during or after the session, integration system 218 may provide information that it has collected from the session to various users of the system, such as by a collaboration report 222.

Figure 9:
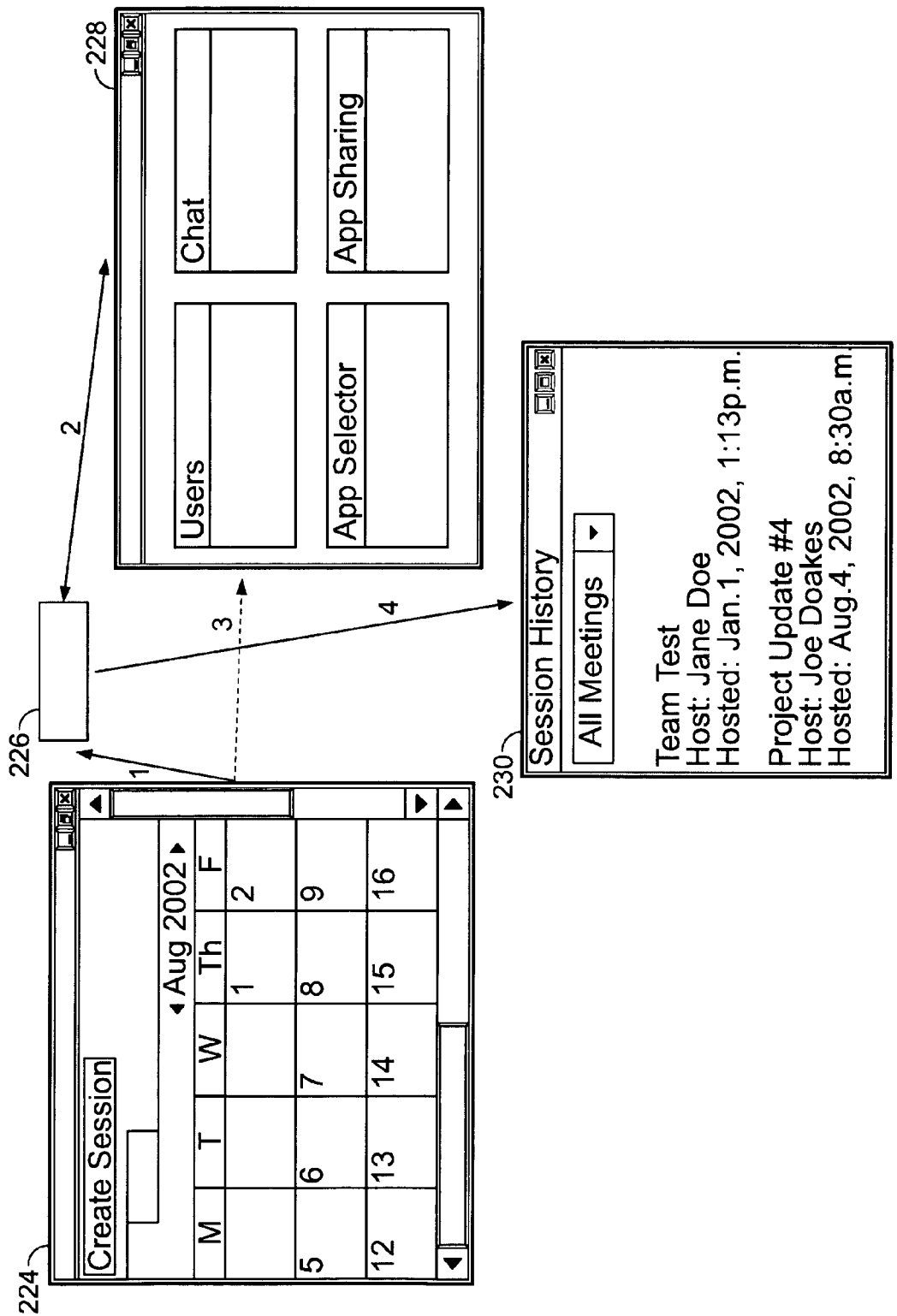
FIG. 9 is an interaction diagram showing steps that may be performed to start a scheduled collaboration session.

FIG. 9 is an interaction diagram that shows views that a user may be presented in connection with steps that are performed to start a scheduled collaboration session. This figure is similar to FIG. 8, but the calendar view 224 shows a calendar for scheduling a meeting rather than choices for an immediate meeting. The user's interaction with calendar view 224 may result in a message being sent to integration system 226 so that RTC application 228 is launched by a service provider at the scheduled time. Also at an appropriate time, integration system 226 may collect information regarding the established session and may provide such data to collaboration report 230.

Figure 10:
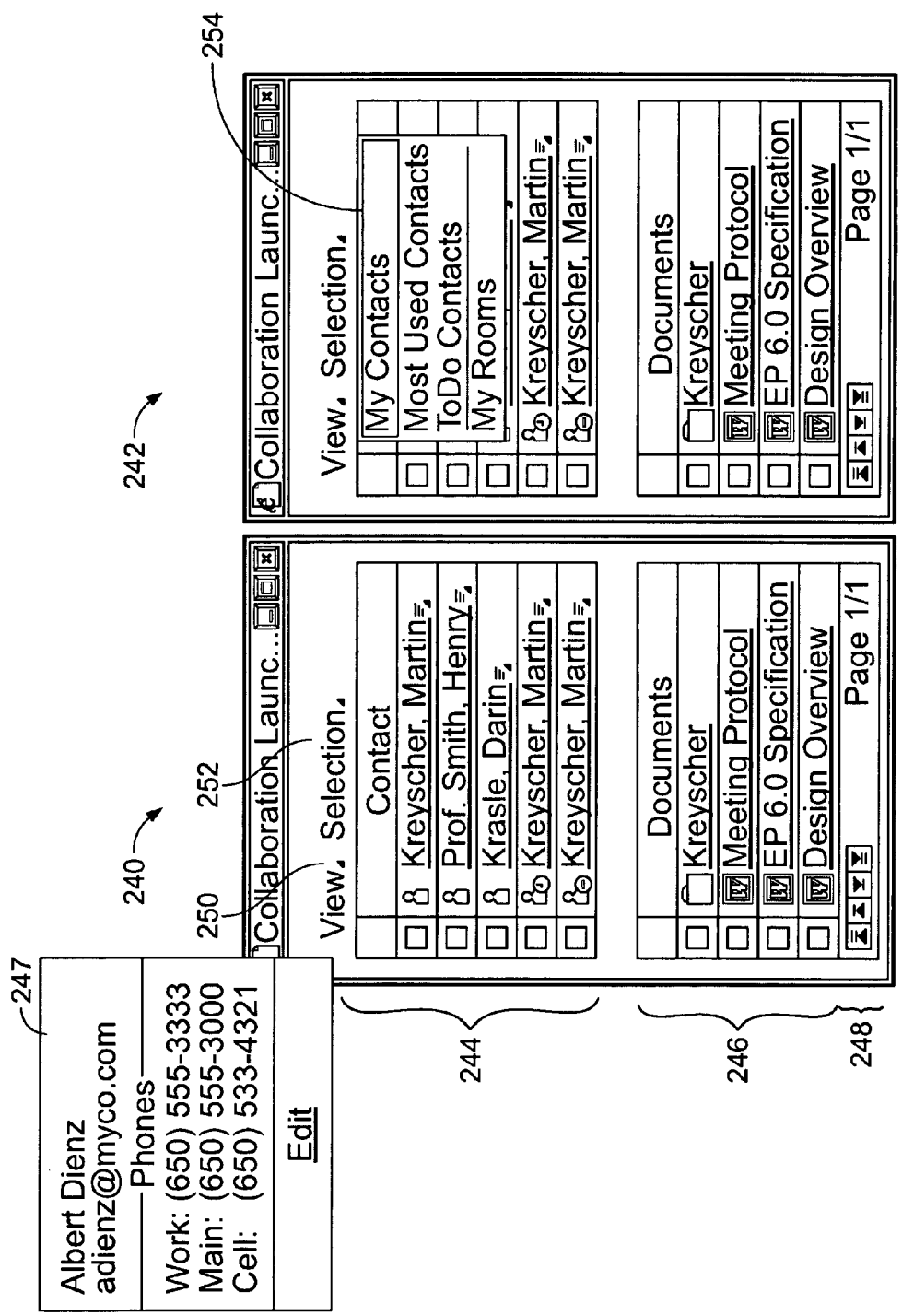
FIG. 10 shows two views of a collaboration launch pad.

FIG. 10 shows two views of a collaboration launch pad. Launch pad 240 is shown with a pop-up 247, while launch pad 242 is shown with menu 254. Launch pad 240 contains a menu display area with a view menu entity 250 and a selection menu entity 252. Launch pad 240 also contains a contact display area 244, which may present a number of contacts, such as other computer users, with which the local user may establish a collaboration session. As shown, the contacts are represented as a list of contact names sorted alphabetically by the last name. The contacts are shown as hyperlinks, so that selection of a contact may produce a display that shows information about the contact, such as a business card, or may start a collaboration process with the contact, such as by opening an empty e-mail addressed to the contact. In addition, information about a contact may also be displayed in pop-up 247 associated with the launch pad 240 if a pointer is allowed to float over the contact for a predetermined time.

Each contact shown on launch pad 240 may be accompanied by various sorts of condition information for the contact. For example, in FIG. 10, an icon of a person is displayed next to the contact hyperlink, and may indicate the status of the contact, such as whether the contact is currently online, in a meeting, or away. If the pointer is hovered over the icon, a text representation of the status may also be displayed. In this manner, the local user can determine, for example, whether another user represented by a contact is available for a synchronous collaboration session, such as chat, or any other type of session. Also, if the local user has established a time for a scheduled collaboration session, the user may be provided with information that shows whether a particular contact is available at that time for the session.

Also, a contact selection box, in the form of a check box or other appropriate structure, may be provided so that the local user can select contacts to take part in any potential collaboration sessions. Thus, if one or more users are selected and the local user chooses to launch a collaboration session, the launch pad 240 may cause the session to launch automatically with the selected contacts included in the session. If the collaboration session is provided by an external provider, the system may also pass appropriate information about the selected contacts to the service provider so that the selected contacts are brought into the session. If no contacts are selected when the local user chooses a collaboration service, the user may be given the opportunity to specify contacts after the session is started.

Another icon to the right of the contact hyperlink may be selected to display a pop-up menu (not shown) for configured collaboration services. For example, in FIG. 10, if the icon next to the hyperlink for Darin Krasle is selected, a pop-up menu showing collaboration services that may be used to communicate with Darin may be displayed, and the local user may select one of the tools to begin an immediate collaboration session with Darin.

In this manner, alternative ways to launch a collaboration session may be extended to the local user, but may be done so in a unified manner across the different types of collaboration services and with various objects involved in the session. In particular, a local user could start a chat session with a co-worker by checking the contact selection box for the user and then select a chat service from a menu. Alternatively, the local user could simply select chat from the configured collaboration service pop-up menu. The local user could take a similar route to establish other types of collaboration services, such as virtual meetings or establishing virtual rooms, in a similar manner, thereby having the oportunity to establish sessions in various ways but with a uniform interface.

In addition, the system permits similar relationships to be established and maintained between users and information (such as collections of business objects), and between services and information. For example, a user may be linked to a particular document or virtual room, apart from the service or services the user might use to access the document or room. As such, a configurable and extendable set of services that strongly relate to people can be established so that, for example, a telephone conference could easily be launched by passing contact information to a telephony provider, CRM activities could be launched from a CRM system, a PM system could show project assignments, and an HCM system from which a leave request has been made could show a skill set of a particular employee. Also, a document or room may be associated with a particular service, independently of the user or users that will have access to it. In this manner, the system is capable of managing a triangle of people, information, and services in a flexible manner, that allows simplified sharing of information about something or somebody.

Object display area 246 may show a number of objects, such as documents, that may be associated with a collaboration session. Each object may be provided with an icon that indicates the type of the object, such as icon that indicate that the object is a word processing document. The objects may also each be associated with a selection box that may be checked to indicate that a document should be included in a collaboration session. For example, if the local user wishes to send an e-mail with an attached document to several contacts, the user may select the appropriate contacts in contact display area 244, select the appropriate document or documents in object display area 246, and then choose an e-mail collaboration service. An e-mail could then be generated with the appropriate address information filled in and the document or documents pre-attached. In a similar manner, a user could establish a virtual meeting or a virtual room, with particular selected objects and particular selected contacts.

Objects displayed in launch pad 240 may be organized in any appropriate manner. As one example, the organization may be hierarchical, with particular objects gathered together in common folders that can be navigated by the local user. Other objects, such as contacts, may also be grouped and organized in a like manner (such as by company, project, or work group). Objects may also include e-mails, reports from a business information (BI) system, and objects from ERP or legacy systems, such as sales orders, purchase orders, material master data, and invoices. Objects could also include items such as video or voice recordings. Other types of objects may also be accessed, depending on the needs of the user and the configuration of the system.

Navigation display area 248 may contain features for moving through information displayed by launch pad 240. For example, a page indicator may show what page the local user is viewing if the information in launch pad 240 has been split between or among multiple pages. Other display items, such as arrow controls, may also be provided to allow the user to move from one page to another.

Launch pad 240 can be displayed in any appropriate manner. For example, it can be launched in the tool area of a portal (e.g., by clicking a link in the header area of the portal), and may be displayed as a view in the portal. It can also be launched as a single-user object or a selection of users (e.g., by selecting one or more users from the team member list of a collaboration room, and right-clicking to bring up a menu that includes the launch pad, so that the launch pad is brought up with the members pre-selected), or a single object or collection of objects, and may be displayed as a simple object (e.g., by selecting three sales orders in a view associated with an ERP system, and right-clicking to bring up a menu that includes the launch pad 240, so that the launch pad 240 is brought up with the objects pre-selected).

An object (such as a team, user, selection of users, business object, or selection of business objects) may also be dragged into a tool area and released, so as to bring up the launch pad 240 with the object or objects selected. Also, an appropriate application may be configured to bring up the launch pad 240 and cause certain objects and information to be passed to the launch pad 240, such as using the LDAP protocol or other appropriate and compatible manner of communication. Such an application could include a legacy system or other system, such as CRM/HCM systems, or other systems that operate upon teams and groups.

Launch pad 240 may also be displayed as a floating or anchored window (as shown), so that the user does not lose the context of other work the user may be performing in other windows. Furthermore, launch pad 240 may be displayed as part of the user's computer desktop.

Launch pad 242 is similar to launch pad 240, but displays a pop-up menu 254 corresponding to the selection menu selector. Menu 254 contains options that can control the displays of launch pad 242. For example, a user may select "My Contacts" to make launch pad 242 display contacts that the user has previously identified (such as a list of co-workers and friends). The frequency with which a user establishes collaboration sessions with other users may also be tracked, so that the user can choose to display the most used contacts, such as the ten most used contacts. In addition, the user may choose to display virtual rooms to which the user has been invited or which the user has previously visited.

Figure 11:
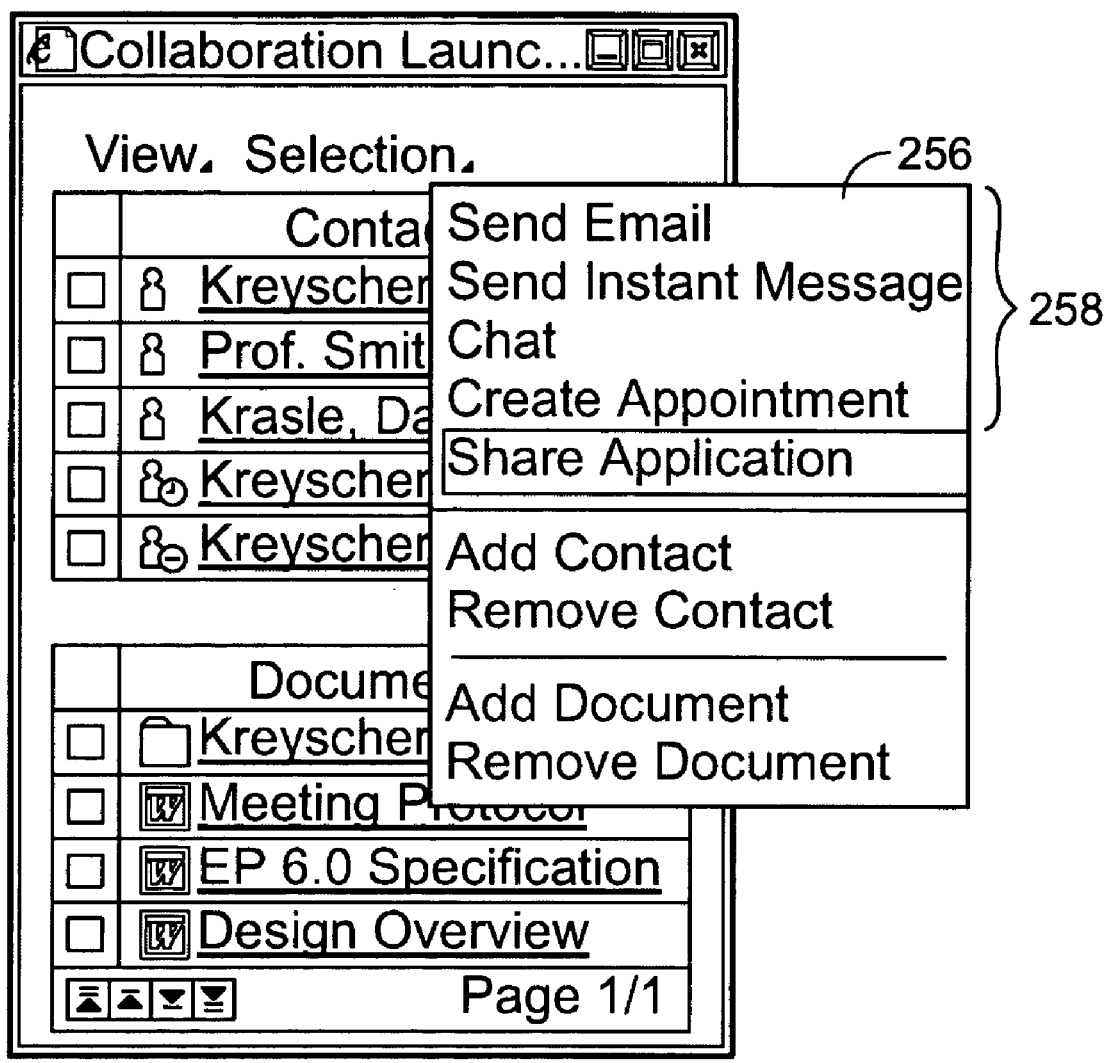
FIG. 11 shows a view of a collaboration launch pad with a menu.

FIG. 11 shows a view of a collaboration launch pad with a menu 256 for controlling collaboration sessions. Menu 256 shows a number collaboration services in collaboration service display area 258. The services may be a set list of services, or may be displayed according to access rights of the local user. For example, for a "power user" who needs to collaborate extensively with other users in other organizations and with multiple types of objects, the list of available services may be extensive. A more limited user might be restricted to using services (such as e-mail, chat, and instant messaging) that can be provided by the organization's own computer system for free. Menu 256 also shows areas for adding or removing contacts and other objects from the launch pad. The services may include groupware-related service, services for synchronous collaboration (e.g., telephony, instant messaging, chat, and virtual meetings), services for asynchronous communication (e.g., e-mail), and services for more complex scenarious (e.g., for virtual rooms).

Figure 12:
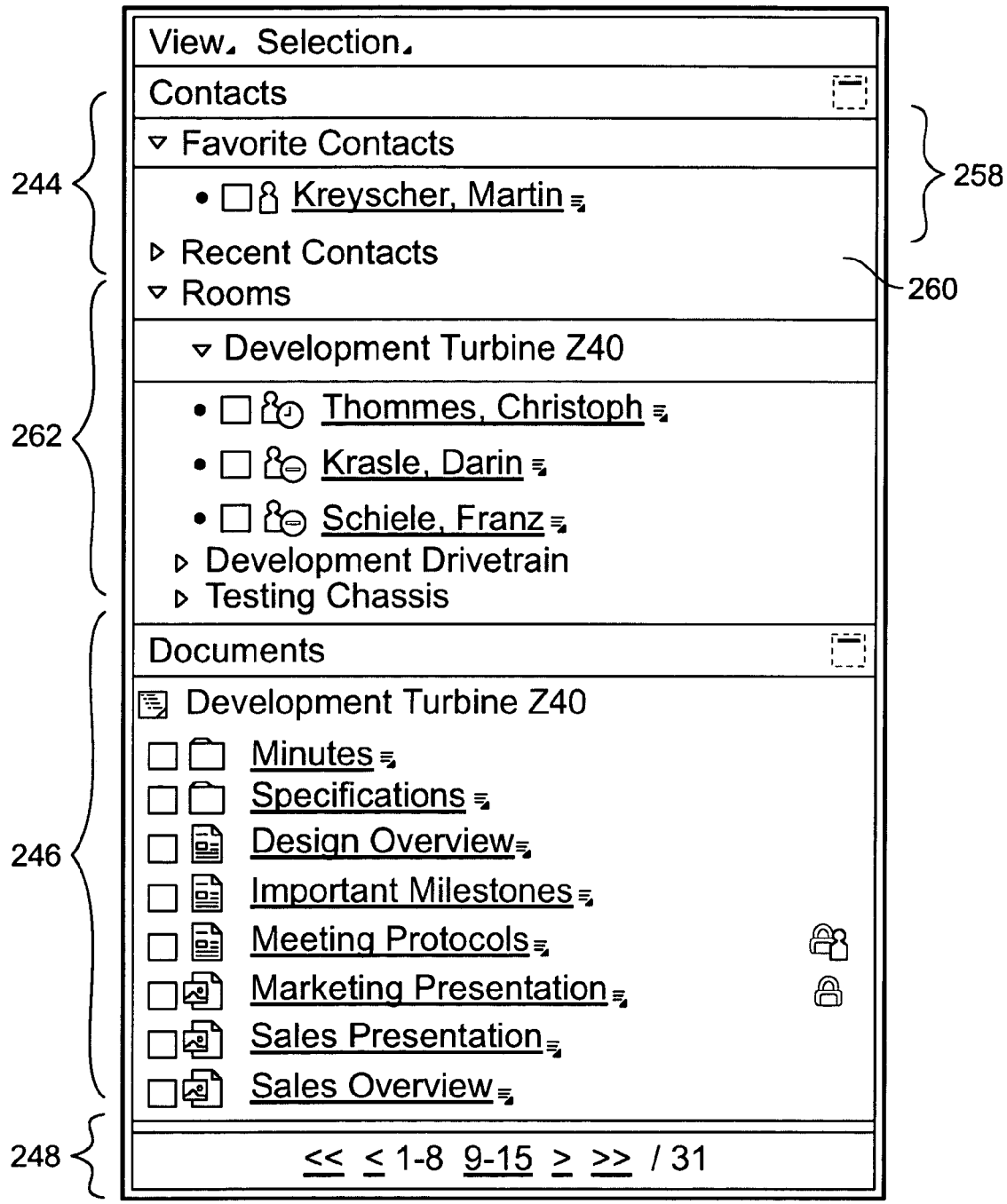
FIG. 12 shows a view of a collaboration launch pad having a hierarchical display.

FIG. 12 shows a view of a collaboration launch pad having a hierarchical display. Contact display area 244 shows both a favorite contacts display area 258, which shows a list of contacts the local user has identified as favorites, and a recent contacts display area 260, which lists contacts with whom collaboration sessions have been scheduled recently. Each display area may be collapsed or expanded, as shown by favorite contacts display area 258, which is expanded, and recent contacts display area 260, which is collapsed.

Rooms display area 262 shows a number of virtual meeting rooms to which the local user has access. Contacts may be associated with the room, such as the other users who have access to a particular room. The display of users associated with a particular room can provide an easier way to establish a collaboration session around a virtual room. For example, a local user could establish a chat session with other members of a room. By organizing the session through the room, a record of the session may be automatically maintained and assigned to an archive associated with the room.

Object display area 246 shows a hierarchical list of objects, some of which are word processing documents, and others of which are presentations that may be shared in a collaboration session. Other objects have associated icons that show the security status of the object. For example, a padlock can indicate that a document is is inaccessible or can only be viewed but not edited, and a user next to the padlock can allow the local user to determine what other user has access to the object, or has control over the access to the object. Navigation display area 248 provides the user with tools to navigate the launch pad in a familiar manner.

Figure 13:
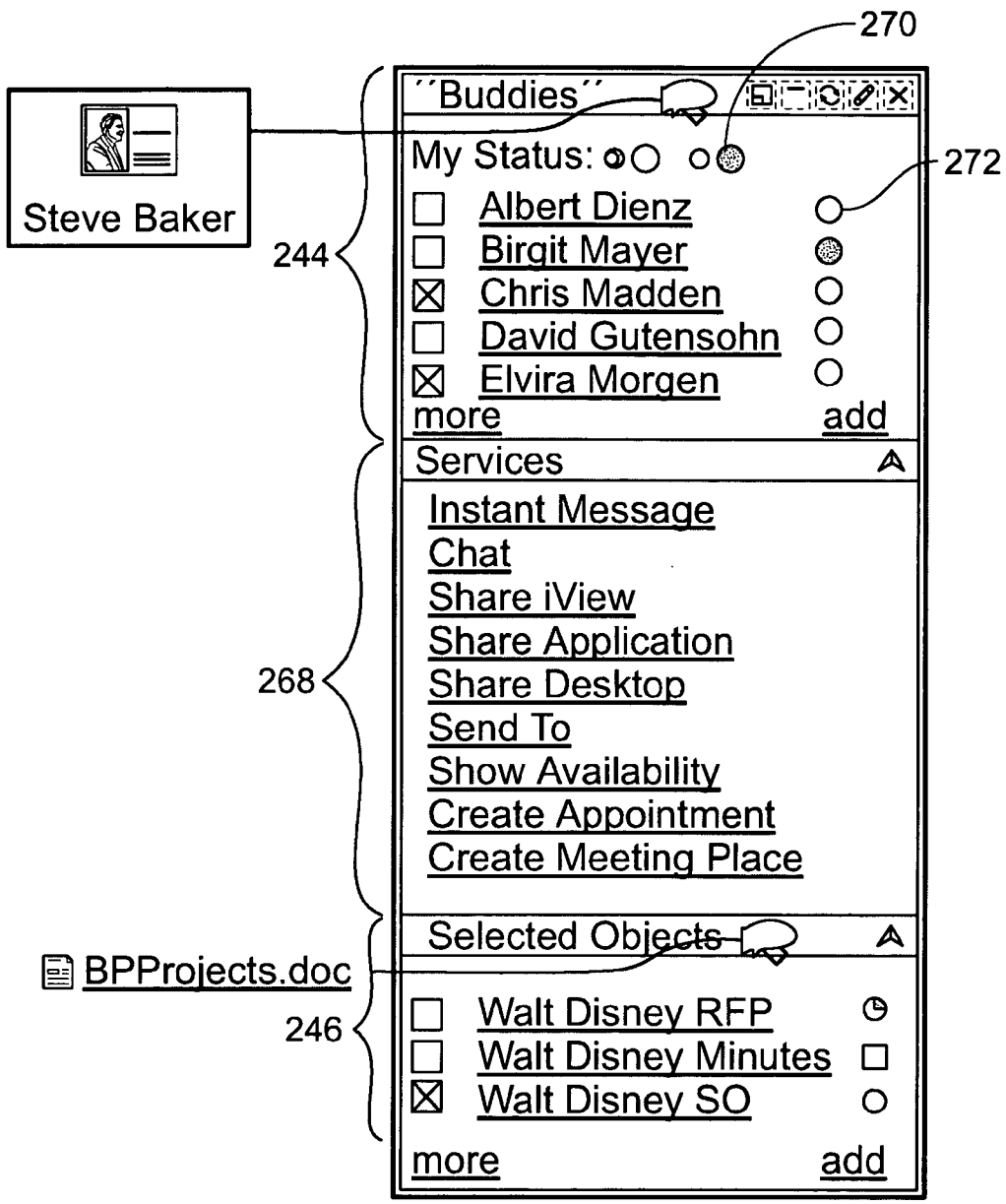
FIG. 13 shows schematically the addition of items to a collaboration launch pad.

FIG. 13 shows schematically the addition of items to a collaboration launch pad. Objects may be added to launch pad 264 in any appropriate manner. For example, as shown in FIG. 13, a user may drag an object corresponding to a contact, such as an electronic business card, over an drop zone on launch pad 264 and may release a pointer button to have information related to the contact added to the system so that the contact may be displayed in the contact display area 244. Objects may also be more complex, and may include, for example, groups of contact information, such as a set of identified contacts, sessions, and objects for the launch pad. In such a situation, a user could drag the object over a closed or open launch pad, and a launch pad session may be established using the information from the object. The launch pad may then be reset to its initial value the next time it is started, or the user may choose to have the launch pad maintain the newly added information from the object.

As shown in FIG. 13, the drop zone is a particular, visually distinct zone in the contact display area. Another drop zone is shown for object display area 246, and may operate in a manner similar to the drop zone for the contact display area 244. The drop zones could also take other forms, such as by occupying the entire contact display area or the entire launch pad area, so that an object (whether as a contact or other form of object) may be added to the appropriate display area based on its object type (i.e., if the object contains contact information, then the information is added to the contact display area regardless of where the object was dropped). Alternatively, objects may be added or removed from launch pad 264 using standard add and remove buttons. Objects may also be added to launch pad 264 through other applications, such as by adding a contact to a contact list that is shared with the other application.

Status indicators 272 in the form of colored dots indicate whether other users are avilable for a collaboration session. In addition, the local user's status may also be displayed by status indicators 270.

FIG. 13 also shows a collaboration service display area 268 as a separate area of launch pad 264. The various collaboration services may be provided by a number of different collaboration service providers, and may be displayed in a single area. For example, chat collaboration could be provided over an intranet, while complex virtual meetings may be provided by an external service, such as in a web browser window as discussed above. The local user, upon selecting contacts and objects for a collaboration session, may then select a collaboration service, such as a virtual meeting, and the session may be scheduled or started as explained above.

When a local user selects contacts and/or objects with which to collaborate and also selects a service for the collaboration, a context ID may be created for the collaboration session. The context ID identifies the session and the contacts and/or objects that are associated with the session. The context ID may then be sent to the service provider, such as by an extension to a URL that is sent to the service provider, as described above. This information may allow the service provider to perform the needed steps to fully establish the collaboration session.

The launch pad 264 may communicate with an integration system, which may be used as a middleware component to track information about a session and to trigger a session, as explained in more detail above. As such, the launch pad 264 may send all relevant session information to the integration system or have information sent to the integration system, and the integration system may provide information to, and receive information from, the service provider, so that the integration system may archive or act upon the information as is appropriate.

Figure 14:
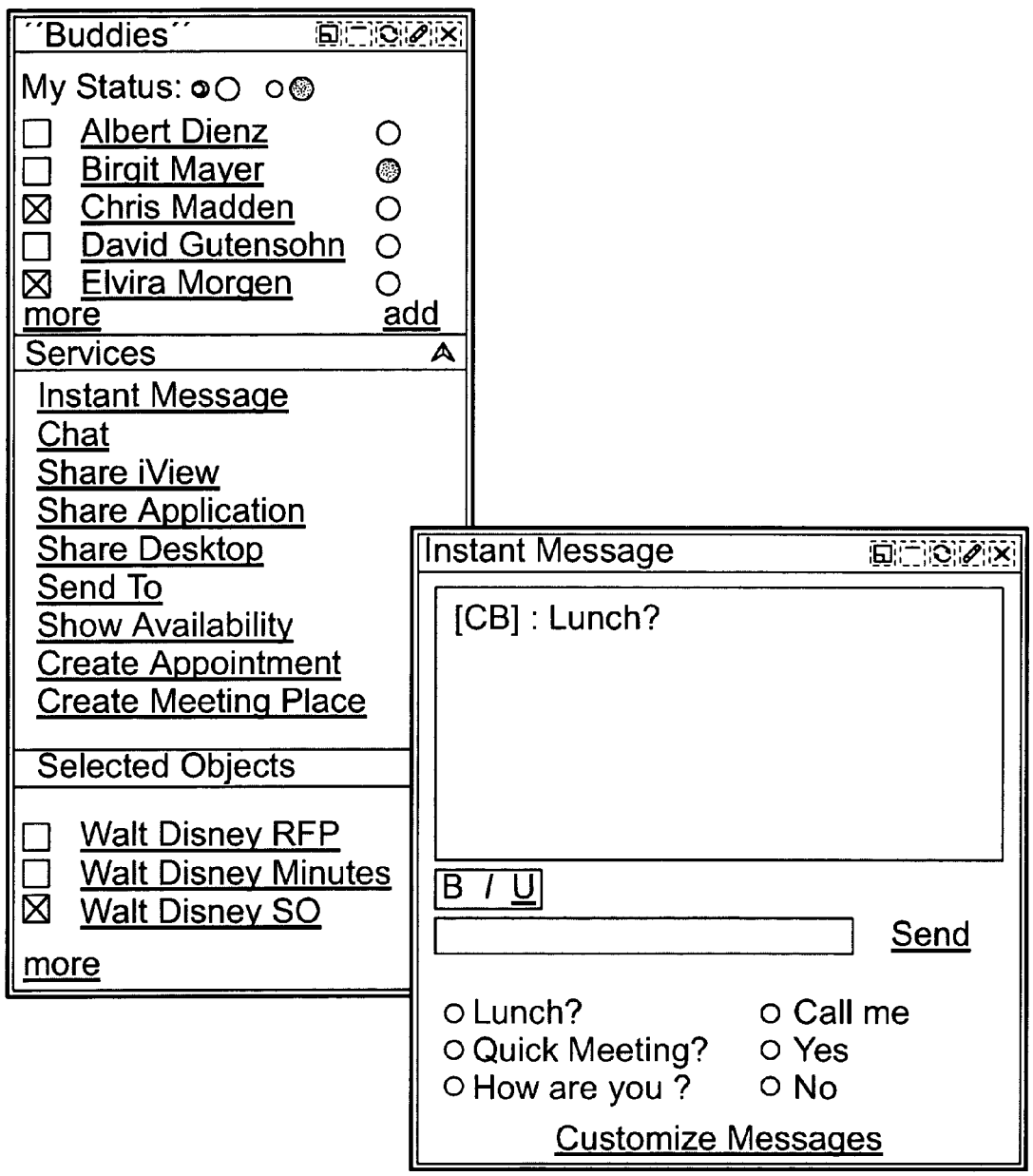
FIG. 14 shows a collaboration launch pad with an instant messaging session.

FIG. 14 shows a collaboration launch pad with an instant messaging session. In the launch pad, the local user has selected one contact (Elvira Morgan) as a collaboration participant, and instant message as a collaboration service. These selections have caused an instant message session to be launched in a separate window, and supplied with certain shortcuts, such as selections for frequently-used phrases. The local user may also use the launch pad to start additional collaboration sessions, which may be open concurrently with the first collaboration session. The second collaboration session may have the same or different participants as the first session. For example, the local user may initially begin a chat session with colleagues (as shown in FIG. 13), and may then determine that it would be preferable to have access to objects in a virtual meeting room. The user may then select the room, and the chat session may occur concurrently with the visit to the meeting room. Alternatively, the chat session may be automatically terminated in favor of any chat features in the room. The record of the chat session could also be transferred to the virtual room application so that it could be archived with the room. In addition, the local user may select additional contacts while a session is occurring, by checking the box next to their contact selectors, and the contacts may be added to the session if they are avilable.

As another example of the operation of the launch pad, a sales manager may desire to share a sales order with a co-worker in their employer's financial department, such as to clarify certain legal issues regarding the order. The manager could add the order to an open view in the manager's portal, and choose to access the launch pad. The manager may then add his co-worker as a participant to the pending collaboration session, and initiate the session as a session to share the sales order in the particular portal application. The launch pad may then generate an invitation to the co-worker for the session, start the application to display the sales order, and pass the application to the appropriate collaboration service. Alternatively, processes for establishing a collaboration session may also be used, and may include, for example, performing the steps discussed above in different orders.

Figure 15:
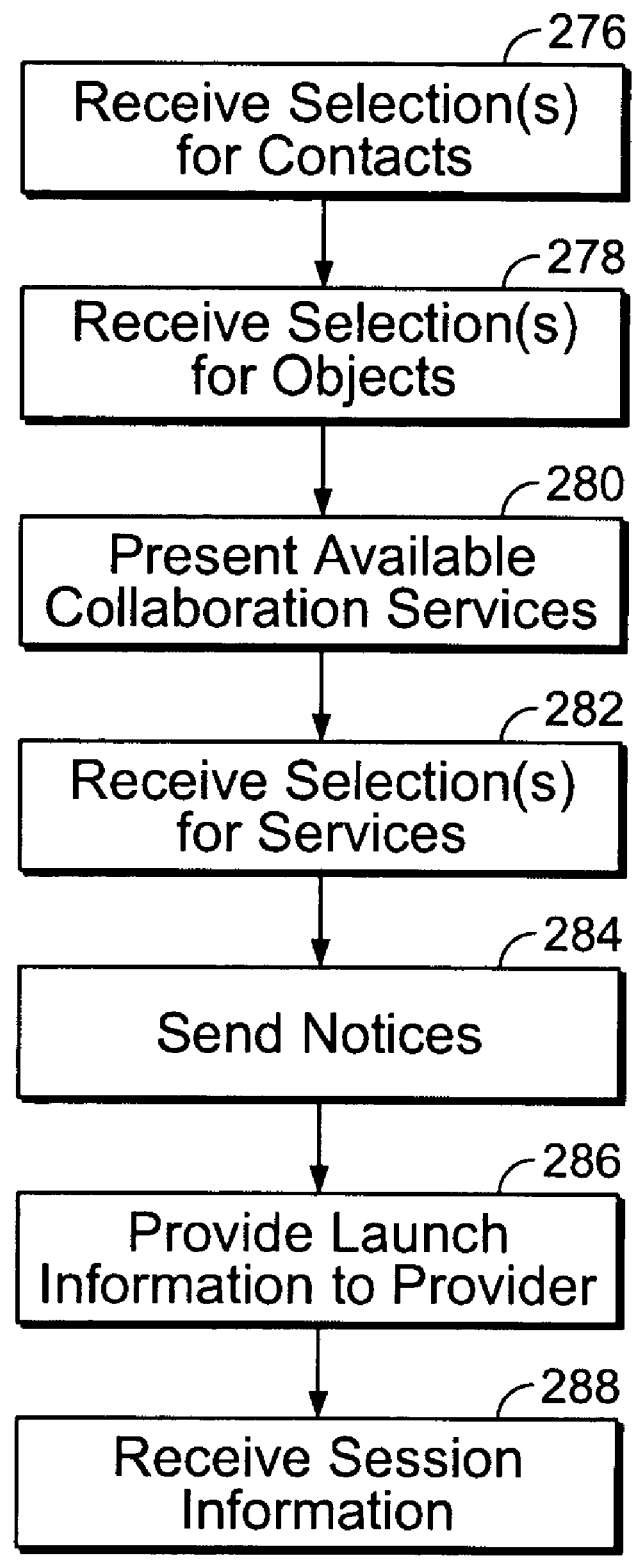
FIG. 15 is a flowchart of a process for establishing a collaboration session with a collaboration launch pad.

FIG. 15 is a flowchart of a process for establishing a collaboration session using a launch pad. At block 276, a user may select a contact or contacts with which to establish a prospective collaboration session. For example, the user may mark one or more colleagues on a list of favorite contacts. At block 278, the user may also select one or more objects to be accessible in the collaboration session. For example, the user could select a document off a list of documents that the attendees of the collaboration session will be able to review or edit. Also, the user could access the collaboration launchpad while interacting with a particular object, and the object may thereby be automatically selected.

At block 280, the available collaboration services may be displayed. For example, a static list of services may be displayed at all times. Also, a dynamic list may be displayed, so that only those services that are available to the then-current selection of contacts and objects are displayed. For example, the system may have access to information about the service to which particular contacts have access or familiarity, and the types of objects that can be used with each service. Thus, when a user selects users and objects, the system may reduce the list of available services, and display only those services that can operate with the selected information. The system may also display a full list, but gray-out the unavailable services to indicate that they cannot be selected.

At block 282, the system receives a selection for the collaboration service to be used. This may cause the system, at block 284, to send notices or invitations to users that have been selected to participate in the session. It may also cause launch information to be provided, such as in the form of a URL passed to a user directing the user's application to re-direct to a service provider and pass information to the provider, as shown by block 286. As the session progresses or at the end of the session, the system may receive information regarding the session, such as by receiving information from the service provider regarding the length of the session and the participants in the session.

As used herein, the terms "electronic document" and "document" mean a set of electronic data, including both electronic data stored in a file and electronic data received over a network. An electronic document does not necessarily correspond to a file. A document may be stored in a portion of a file that holds other documents, in a single file dedicated to the document in question, or in a set of coordinated files.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components.

The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Portions of this disclosure discuss operation though a portal, but any of a number of access systems and methods may be used to manage collaboration sessions. The logic flows depicted in FIGS. 3-9 do not require the particular order shown, or sequential order, to achieve desirable results. Other embodiments may be within the scope of the following claims.

What is claimed is:

1. A computer-implemented method of providing collaboration services to a user affiliated with an organization, the method comprising:
   displaying a plurality of contacts in a collaboration display area;
   receiving a selection of one or more contacts from the plurality of contacts;
   displaying in the collaboration display area a plurality of collaboration service options associated with a plurality of collaboration service providers, a choice of collaboration service providers displayed being conditioned by data characterizing the organization's contracts with collaboration service providers and the selection of one or more contacts;
   displaying a plurality of business objects in the collaboration display area organized or grouped hierarchically or by company, project, or work group, the business objects comprising data structures characterizing a physical or logical object of significance to a business;
   receiving a collaboration request relating to a displayed collaboration service option and selecting one or more of the business objects;
   initiating a collaboration session with a selected collaboration service provider including the selected one or more business objects;
   associating the one or more selected contacts with the initiated collaboration session; and
   capturing information about the collaboration session, the information comprising an identity of the user, duration of the collaboration session, and the collaboration services and collaboration service providers selected to allow for allocation of costs within the organization.

2. The method of claim 1, further comprising: receiving a selection of one or more business objects after the collaboration session is initiated.

3. The method of claim 1, wherein the plurality of business objects are displayed as a hierarchy of folders and business objects associated with the folders.

4. The method of claim 1, further comprising displaying a plurality of available collaboration rooms in the collaboration display area.

5. The method of claim 1, further comprising displaying a status of each of the plurality of contacts in the collaboration display area.

6. The method of claim 1, wherein the plurality of contacts comprises a list of frequently used contacts.

7. The method of claim 1, further comprising providing information about the collaboration session to a data repository.

8. The method of claim 1, further comprising displaying a drop zone in the collaboration display area, receiving information relating to an item dropped in the drop zone, and displaying a selection corresponding to the item in the collaboration display area.

9. The method of claim 8, wherein the item comprises a contact identification entity having information for establishing communication with a computer user.

10. The method of claim 9, wherein the item comprises an object identification entity having information for establishing a connection to a document in a collaboration session.

11. The method of claim 1, further comprising:
receiving a second collaboration request relating to one of the collaboration service options provided by a second collaboration service provider;
initiating a second collaboration session from the second collaboration service provider.

12. The method of claim 11, wherein at least two collaboration sessions are displayed concurrently.

13. The method of claim 12, further comprising receiving a session end request, and ceasing the display of the first and second collaboration sessions in response to the session end request.

* * * * *